Feb. 13, 1951 E. P. PALMATIER ET AL 2,541,661
ANTI-ICING MEANS FOR AIRCRAFT PROPELLER BLADES
Filed Dec. 18, 1945 3 Sheets-Sheet 3
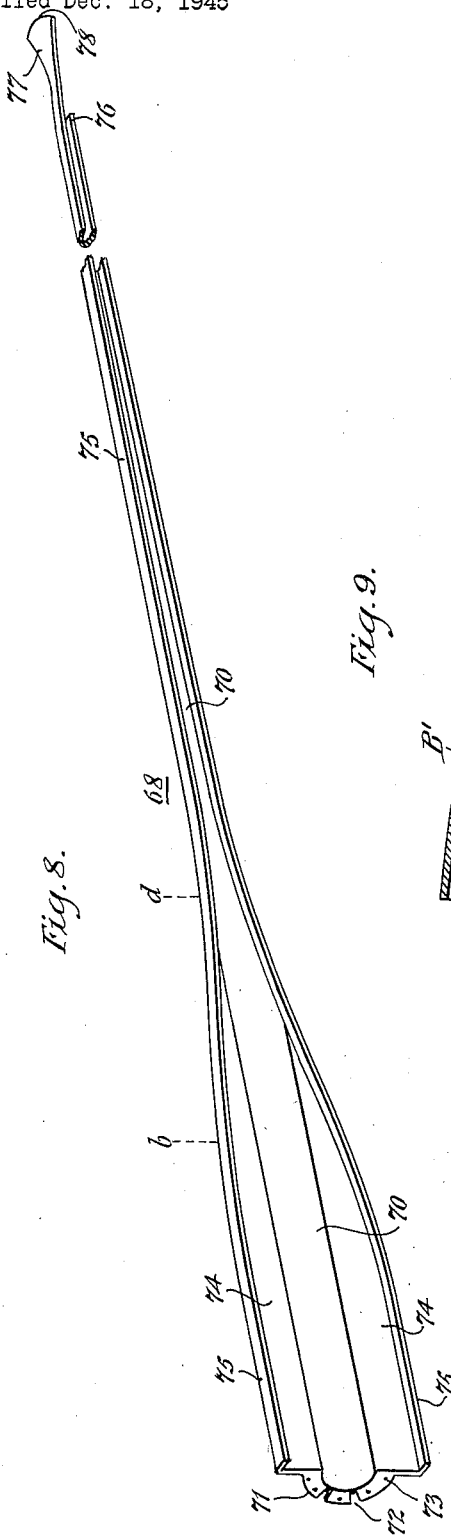
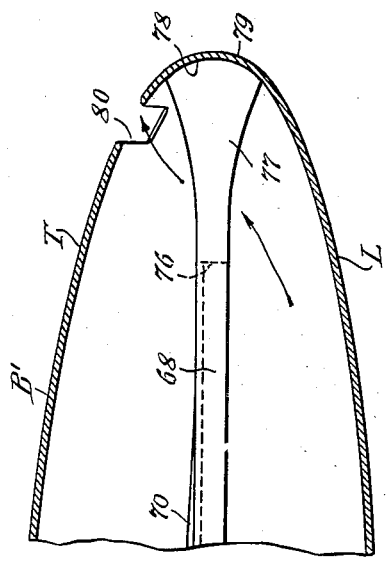
INVENTORS
Everett P. Palmatier
BY William E. Bates
ATTORNEY Patented Feb. 13, 1951

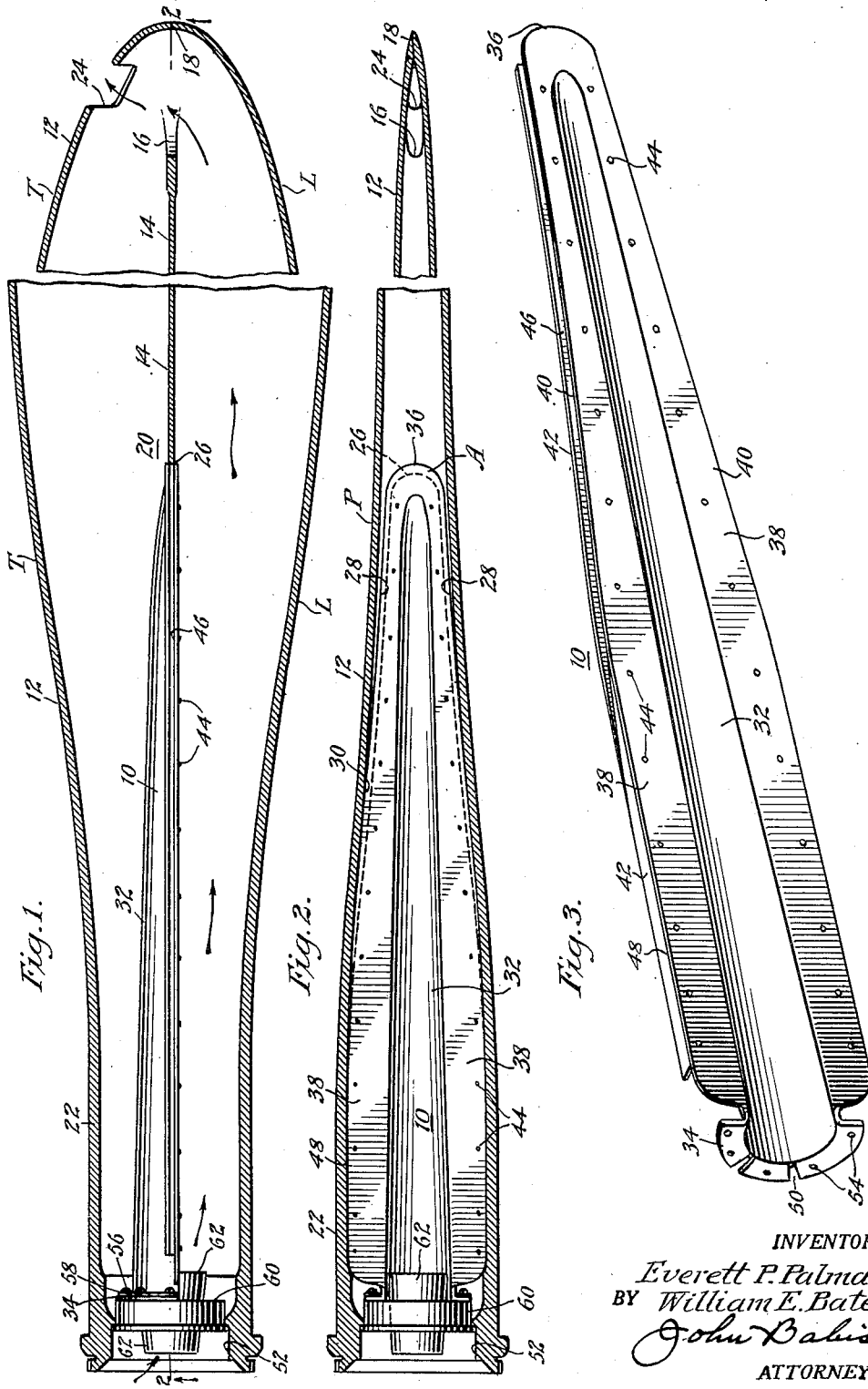

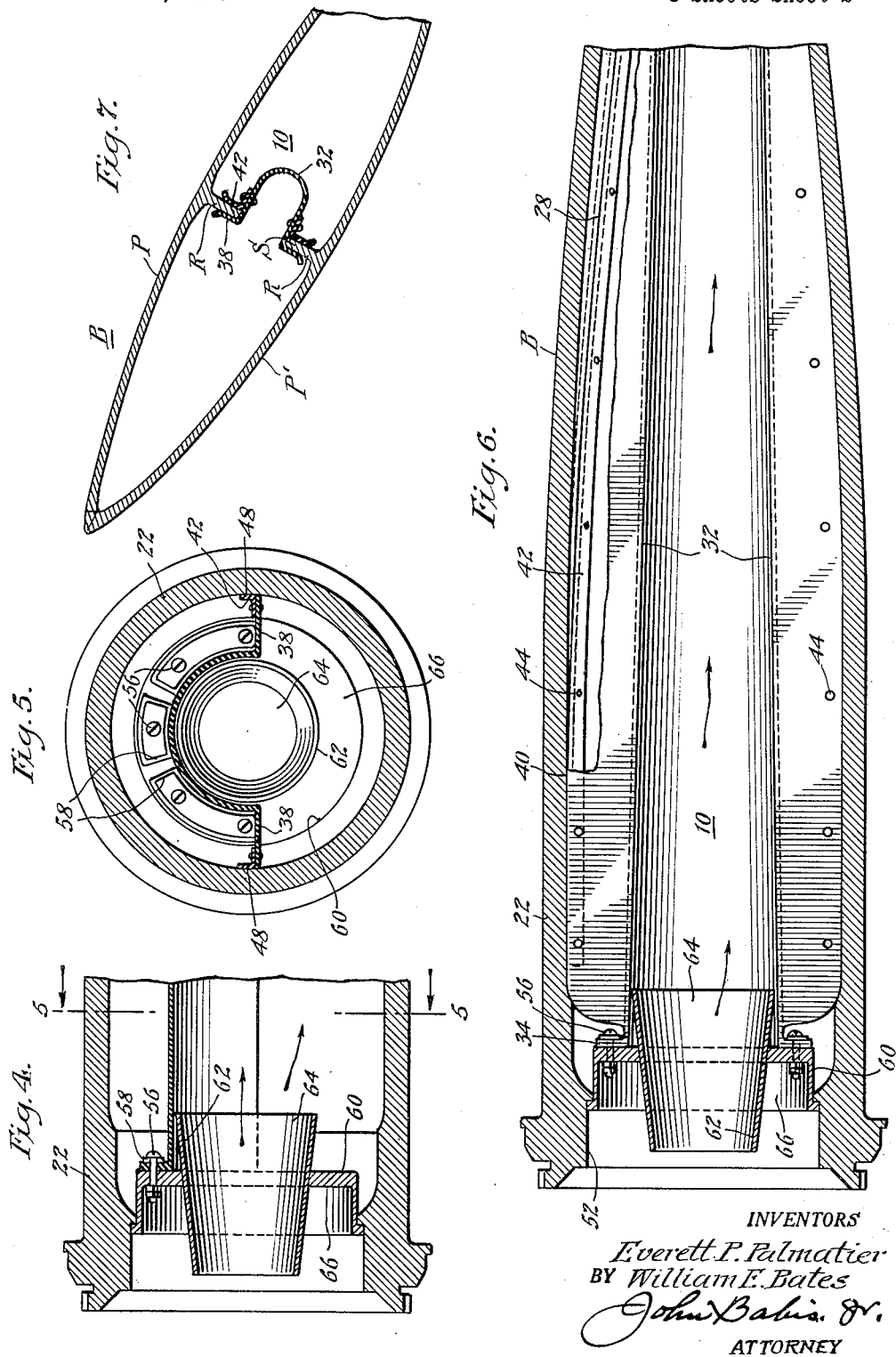

2,541,661

UNITED STATES PATENT OFFICE 2,541,661

ANTI-ICING MEANS FOR AIRCRAFT PROPELLER BLADES

Everett P. Palmatier, Solvay, N. Y., and William E. Bates, Little Falls, N. J., assignors to Curtiss-Wright Corporation, a corporation of Delaware Application December 18, 1945, Serial No. 635,749

11 Claims. (Cl. 244—134)

This invention relates to hollow, metallic aircraft propeller blades and more particularly to exceptionally large blades of this character wherein the flow of a heated medium, when introduced therein, is restricted to the leading edge half thereof substantially throughout the length of the blade.

The invention has particular reference to a hollow, metallic aircraft propeller blade which is partitioned longitudinally to provide two separate internal chambers extending substantially from the root end of the blade to a point adjacent the tip end thereof, said tip end being provided with a trailing aperture whereby the introduction of a heated medium into one of said chambers will discharge through said aperture to the atmosphere.

The invention has further reference to a hollow propeller blade which is provided with a longitudinal reinforcing rib extending from a point adjacent the tip end thereof to an arbitrary inboard point short of the shank portion of the blade, and a yieldable non-metallic insert continuing from the inboard end of the reinforcing rib to substantially the root end of the blade whereby said blade is divided longitudinally substantially throughout its length into two separate edge chambers.

With the more recent development of large, hollow, steel propeller blades, each having a length of approximately ten feet, for example, the problem of protecting such a large blade surface against an icing condition has been proportionately magnified. In accordance with the present invention, this problem has been solved by thermally protecting only the leading edge half or that portion thereof found to be subject to icing substantially to the exclusion of the remainder of such propeller blades. Thus, the required volume of heated air, for example, is not greater than that required throughout the entire area of similar blades of much smaller dimensions.

Accordingly, it is an object of the invention to confine a heated medium to and along the entire leading edge half of a large hollow steel propeller blade.

A further object of the invention is to thermally protect the entire leading edge half of a large, hollow steel propeller blade against an icing condition independently of its opposite edge half.

Another object of the invention is to thermally protect a large, hollow steel propeller blade against an icing condition throughout its leading edge region from the tip to the shank end thereof independently of its opposite edge region.

With these and other objects in view, the invention resides in the novel construction, combination, and arrangement of parts, the novel features of which are set forth with particularity in the appended claims, the invention itself, however, both as to its organization and its method of operation, together with additional objects and advantages thereof, being best understood from the following description of a specific embodiment, when taken in connection with the accompanying drawing in which:

Fig. 1 is a fragmentary longitudinal sectional view of a rib reinforced propeller blade illustrating the invention as applied thereto;

Fig. 2 is a similar view taken on the line 2—2 of Fig. 1;

Fig. 3 is a perspective view illustrating the yieldable, non-metallic, insertable partition member per se;

Fig. 4 is a detail elevational view in section illustrating a closure member, for the root end of the blade, to which one end of the partition is secured;

Fig. 5 is a transverse sectional view of the same taken on the line 5—5 of Fig. 4;

Fig. 6 is a longitudinal sectional view illustrating the manner in which the insertable partitioning member cooperates with the terminating inboard end portion of the blade reinforcing rib; and Fig. 7 is a transverse sectional view of a hollow propeller blade showing the integral partial ribs and the manner in which the invention is disposed in cooperative relation therebetween;

Fig. 8 is a perspective view of a modified form of the invention; and

Fig. 9 is a fragmentary sectional plan view illustrating the manner in which the tip engaging end of the modified partition cooperates with the interior tip portion of a hollow blade.

Referring to the drawings, Figs. 1 and 2 illustrate the manner in which a panel or partitioning member 10 is associated with a relatively large hollow steel propeller blade 12, preferably although not necessarily, reinforced by means of a longitudinally extending central rib 14 bridging the space between the inner surfaces of the blade from a point 16 adjacent the tip 18 of the blade, to an arbitrary inboard point 20 short of the shank portion 22 of the blade. Moreover, the blade 12 is also provided with a vent slot or opening 24 extending inwardly from its trailing edge T immediately adjacent the tip 18, as clearly shown in Fig. 1.

As illustrated, the hollow propeller blade 11 comprises a structure which is produced from a pair of preformed plates P and P' disposed in facing relation and forming an interior chamber and, preferably, with a central reinforcing rib 14 bridging the interior surfaces of the blade and extending longitudinally thereof for a predetermined distance sufficient to reduce the amplitude of plate vibration, which may be excited aerodynamically or by engine pulsations, whereby stresses within the plates are reduced or minimized during the operation of the blade as a component part of an aircraft propeller. Thus, it occurs that a considerable length of the blade 12, for example 36 inches more or less, outwardly from its root end, is free of the reinforcing rib and its partitioning effect.

As clearly shown in Figs. 1 and 2, the inboard end of the reinforcing rib 14 is provided with a recess 26 of substantially "fish mouth" configuration presenting bifurcated ends 28 which gradually taper down to and flush with the interior surfaces of the blade as at 30, whereby the abrupt termination of the plate stiffening effect of the rib is obviated.

In accordance with the preferred form of the invention, the panel or partition 10 of substantially wedge shape configuration and formed, for example, of woven fiber glass impregnated with a thermo-plastic resin known commercially as "Laminac," is utilized to form a continuation of the blade reinforcing rib 14 substantially to the root end of the blade.

More specifically, the partition 10 comprises a molded, wedge shape member having a tapering, semi-circular channel 32 projecting from one side thereof and terminating at one end of said partition, in a semi-circular flange 34 normal to the plane of the partition. The opposite end of the channel 32 tapers out into the plane of the partition and terminates in a rounded end 36. The plane sections 38 extending from the channel 32 are disposed in a single plane passing through the axial center of the channel 32, as clearly shown in Fig. 3.

The marginal edges 40 of the plane sections 38 converge from the flange 34 to the opposite rounded end 36 in a manner adapted to conform to the interior contour of a given size hollow blade having final profile and pitch twist formed therein.

Each of the opposite marginal edge portions 40 of the partition 10 has a substantially reverse angle strip 42 secured to one side thereof, short of each end of the partition, by means of suitable rivets 44 or the like whereby to form a U shape groove or slot 46 whose depth decreases progressively, as the flanged end of the partition is approached, and terminates in a plane surface 48 normal to said partition 10 at the inboard end of each of said marginal edge portions.

The flange 34, formed on one end of the partition 10 is provided with a plurality of radial slits 50 whereby, when the partition is inserted in the blade, the entire flanged end portion may be contracted or flexed to reduce its radius whereby to permit the passage thereof through the relatively small bore 52 in the root end of the blade as will be clear from an inspection of Fig. 6 of the drawings. The flange 34 is also provided with a plurality of angularly spaced holes 54 for the reception of suitable screw bolts 56 each having a washer or arcuate plate 58 associated therewith.

As clearly shown in Figs. 4 and 6, the flanged end of the partition 10 is adapted to be detachably secured to a balance plug which is press fitted within the shank bore 52. In the form shown, the balance plug comprises a shouldered, cup shaped bushing 60 having a central bore in which a tapered tube or nipple 62 is suitably secured with its free ends extending beyond either side of the bushing whereby to provide a passage 64 to the blade interior and an annular, outer cavity 66 wherein suitable additional metal may be placed as in a final blade balancing operation. Accordingly, the bushing 60 is further provided with a plurality of angularly spaced, radially disposed holes for passage therethrough of the aforesaid attaching screws 56.

In the installation of the partition 10 within the propeller blade 12, the screw bolts 56, with the washers 58 thereon, are first inserted in the flange holes 54, the size of the screw bolts and said holes being such that the said screws will be firmly retained in their respective holes. When this has been done, the partition 10 is held in the plane of the blade rib 14 and its rounded end 36 inserted in the shank bore 52. As the partition is passed further into the blade 12, the flanged end thereof is forcibly flexed or bent sufficiently to permit the passage of said flanged end through the shank bore 52 to the position shown in Fig. 6. Since the partition 10 will spring back to its normal size after the flange 34 has been passed through the bore 52, the opposite plane surfaces 48, adjacent the flange 34, will firmly engage the interior surfaces of the blade as will be understood. At the same time, the bifurcated ends 28 of the rib 14 will have been received, respectively in the upper and lower U shape slot 46, and the rounded end 36 of the partition seated in the recess 26, defining the "fish mouth," in overlapping relation with the rib 14, as indicated at A in Fig. 2.

With the partition 10 positioned in the blade 12 as aforesaid, the balance plug bushing 60 is thereafter so positioned at the entrance of the shank bore 52, that the screw bolt clearance holes therein will register with the extended ends of the screw bolts 56 whereupon the bushing 60 is pressed into the bore 52 and the nuts for the said bolts threaded on the protruding ends thereof as will be understood. To facilitate the foregoing operation, the bolts 56 are preferably of such length that they will extend into their respective holes in the bushing 60 before it is actually pressed into the bore 52. After the said bushing 60 has been pressed home and the nuts threaded on the bolts 56, the excess length of each bolt is sheared off as will be understood.

From the foregoing, it will be readily apparent that the partition 10, in conjunction with the blade rib 14, divides the blade interior into two independent, longitudinally extending passages, only one of which is in communication with the passage afforded by the balance plug bushing 60. Thus, heated air entering the blade shank 22 through the tube 62 in said bushing 60, will traverse the leading edge half of the blade to the exclusion of the trailing edge half until it has reached the tip portion of the blade where it will pass around the outboard end of the rib 14 and finally exhaust to the atmosphere through the vent slot 24 as clearly indicated by the arrows in Fig. 1.

Fig. 7 is illustrative of the application of the invention to another form of rib reinforcement in a hollow propeller blade, as aforesaid, wherein the plates P and P', forming the blade B, are each provided with a rib R known in the art as a partial rib. Such ribs are ordinarily formed integral with said plates centrally thereof and extend throughout a major portion of their length. Thus, in a completed propeller blade, such ribs occupy the same plane with their top surfaces $S_t$, in spaced, facing relation. Accordingly, in such applications, the partition 10 is dove-tailed between the ribs R throughout their length and also extends beyond said ribs to form a continuation thereof to substantially the root end of the blade whereby the interior surfaces thereof, free of the ribs, and the ribs R themselves are bridged to form two independent chambers substantially throughout the blade B in a manner similar to and for the purpose described in connection with the preferred form of the invention.

In a modified form of the invention, illustrated in Figs. 8 and 9 of the drawings, a partition applicable to substantially the full length of a relatively small hollow metallic propeller blade, which is not provided with any form of rib reinforcement, preferably comprises a unitary molded member 68 of non-metallic material, although it may also take the form of a corrugated sheet metal member if desired, is similar in certain respects to the previously described partition 10, except that it is quite narrow throughout most of its length and without rib receiving slots 24.

In its initial state prior to molding, the partition 68 comprises a tapered or wedge shaped section of resin impregnated fiber glass fabric which, when subsequently molded, appears partly folded upon itself to form a semi-circular channel 70 whose cross sectional area decreases progressively substantially throughout its length.

At its largest end, the channel 70 terminates in a flange 71 disposed normal thereto and provided with radial slits 72 and screw holes 73 whereby the partition 68 may be detachably secured within a hollow propeller blade. Lengthwise of the partition at this point, the channel 70 also terminates in two oppositely disposed plane sections 74 whose marginal edge portions are turned over at an angle normal thereto whereby to provide relatively narrow, flat contact surfaces 75 adapted to engage the interior surfaces of a propeller blade.

As clearly shown in Fig. 8, the contact surfaces 75 gradually converge lengthwise from the flanged end of the partition 68 to a point indicated at b where they begin to converge rapidly to a point indicated at d. From point d out to the end 76 of the partition, the said surfaces 75 converge only slightly and, at said end, one of the surfaces 75 continues beyond its opposite surface, in a tip engaging end 77 whose marginal edges diverge and terminate in an arcuate tip end 78 formed on a radius substantially equal to that in the interior of the blade tip 79, as clearly shown in Fig. 9.

From the foregoing it will be readily apparent that as the partition 68 is inserted within a hollow propeller blade, to which it is adapted, the opposite contact surfaces 75 will yieldably engage the interior surfaces thereof whereby the said partition is located and held in a plane normal to the cord line sections of the blade. In a similar manner, the arcuate tip 78 at the extreme outer end of the partition will flex and seat itself in the internal arcuate seam in the tip of the blade whereby the outer end portion of the partition is restrained against displacement within the blade as will be understood.

With a partition, as illustrated in Fig. 8, detachably secured within the propeller blade B', substantially the entire length of the blade will be divided into two independent chambers only one of which is in communication with the bore in the root end of the blade, as described in connection with the preferred form of the invention. Thus, heated air or hot gases introduced into the blade from its root end, will be restricted to the chamber defining the leading edge half of the blade and pass therealong until the tip of the blade is reached where it will pass under the arcuate tip end 78 of the partition 68 and to the atmosphere by means of the vent slot 80 formed adjacent the tip and the trailing edge of the blade, as will be understood.

From a consideration of the herein described invention, it will be readily apparent to those skilled in the art that a simple, reliable and efficient means has been provided thereby for the protection of only the leading edge half of large, hollow propeller blades against an icing condition in conjunction with the normal B. t. u. capacity of a conventional heat exchanger or source of hot gases, without appreciably increasing the weight of such blades or affecting the normal "breathing" or "diaphragming" of the camber and thrust plates of such hollow blades under various operating conditions.

Though the description and illustration embodies but two modifications of the invention, it is to be understood that the invention is not limited to the precise construction shown but may be embraced in many and various equivalent forms. For example, the modification in Fig. 8 may be adapted along its length to engage an integral rib formed on the interior blade surface and the centering tip eliminated, as suggested in the modification of the first form disclosed. Likewise the first form may be extended throughout substantially the entire length of the blade in the event that no partition be afforded by the blade structure alone. As such and many other variations may be made without departing from the spirit of the invention, as will be apparent to those skilled in the art, reference will be had to the appended claims for a definition of the limits of the invention.

We claim:

1. In combination, a hollow metallic propeller blade having an open-ended root forming a prolongation of the blade hollow, a yieldable panel bridging the space between the interior surfaces of said blade forming a partition substantially throughout the length of said blade, said panel being yieldable to enable installation and removal thereof through the blade root end, means formed on said panel for locating and anchoring said panel centrally of said blade in one end thereof, and means for detachably securing said panel within the opposite end of said blade.

2. A hollow metallic propeller blade having an open-ended root in communication with the blade hollow having an internal central rib integral therewith extending longitudinally throughout a portion of its length, a tapered panel yieldable in the plane transverse of the longitudinal axis thereof forming a continuation of said rib in the plane thereof substantially to the root end of said blade, said panel being yieldable to enable installation and removal thereof through the blade root end, and means detachably securing said panel within said blade.

3. A hollow metallic propeller blade having an open-ended root in communication with the blade hollow having an internal central rib integral therewith extending longitudinally throughout a portion of its length, yieldable, heat resistant means forming a continuation of said rib in the plane transverse of the longitudinal axis thereof substantially to the root end of said blade, said means being yieldable to enable installation and removal thereof through the blade root end, and means detachably securing said yieldable means within said blade including a tongue and groove connection with said rib.

4. In combination, a hollow metallic propeller blade having a restricted opening in its root end, and a slot like opening extending inwardly from its trailing edge adjacent the tip end of said blade, an internal rib integral therewith extending longitudinally throughout a major portion of its length, a yieldable panel bridging the space between the interior surfaces of said blade and forming an uninterrupted continuation of said rib to the root end of said blade whereby a passage communicating with both of said openings is restricted to the leading edge half of said propeller blade.

5. A hollow metallic propeller blade having an opening in the root end thereof and an internal central rib integral therewith extending longitudinally throughout a portion of its length and starting a substantial distance outboard of said root end, means forming a continuation of said rib substantially throughout the residual length of said blade, whereby blade interior is divided longitudinally to form two independent chambers one of which is in predominant communication with said root end opening, and means for detachably securing said first named means within said blade in the plane of said rib.

6. In a hollow metallic propeller blade having an opening at its root end communicating with the blade hollow, a removable partition within the blade extending through a substantial portion of said blade along its length, and having sealing engagement with the inner surfaces of the blade walls, said partition dividing the blade hollow into chambers respectively adjacent the blade leading edge and the blade trailing edge, said partition being formed at its root end to establish communication predominantly between said root end opening and said leading edge chamber, said partition being flexible and deformable to enable its insertion into and removal from the blade hollow through said root end opening, and means to secure said partition to the blade root end.

7. In a hollow metallic propeller blade having an opening at its root end communicating with the blade hollow, a removable partition within the blade extending through a substantial portion of said blade along its length, and having sealing engagement with the inner surfaces of the blade walls, said partition dividing the blade hollow into chambers respectively adjacent the blade leading edge and the blade trailing edge, said partition being formed at its root end to establish communication predominantly between said root end opening and said leading edge chamber, means on said partition for engaging elements of said blade inner surface upon insertion thereof in the blade to locate said partition in predetermined position in said blade, said partition being flexible and deformable to enable its insertion into and removal from the blade hollow through said root end opening, and means to secure said partition to the blade root end.

8. In a hollow metallic propeller blade having an opening at its root end and having an internal structural rib therein extending from a point outboard of said root to a point adjacent said tip, said rib dividing the blade hollow into chambers respectively adjacent the leading edge and the trailing edge of the blade, a removable partition within said blade providing an inward prolongation of said rib for extending said leading edge chamber to the blade root, said partition having sealing engagement with the inner blade walls and with the inner end of said rib, and being formed at its root end to establish communication predominantly between said blade root end opening and said leading edge chamber, said partition being flexible and deformable to enable its insertion into and removal from the blade hollow through said root end opening, and means to secure said partition to the blade root end.

9. In a hollow metallic propeller blade having an opening at its root end and having an internal structural rib therein extending from a point outboard of said root to a point adjacent said tip, said rib dividing the blade hollow into chambers respectively adjacent the leading edge and the trailing edge of the blade, a removable partition within said blade providing an inward prolongation of said rib for extending said leading edge chamber to the blade root, said partition having sealing engagement with the inner blade walls and with the inner end of said rib, and being formed at its root end to establish communication predominantly between said blade root end opening and said leading edge chamber, means on said partition for engaging elements of said blade inner surface upon insertion thereof in the blade to locate said partition in predetermined position in said blade, said partition being flexible and deformable to enable its insertion into and removal from the blade hollow through said root end opening, and means to secure said partition to the blade root end.

10. A panel, adapted to be inserted in a hollow steel propeller blade from its root end opening, comprising an elongated, wedge-shaped plate member and means forming a channel along the major portion of the periphery thereof, said plate member being rounded at one end and having flat surfaces disposed in a common plane, a central, longitudinally extending portion offset laterally from said plane, and a semi-circular flange at the other end normal to said plane, said offset portion tapering from the flanged end to a point adjacent the rounded end, whereby the panel is adapted to be flexed throughout the greater portion of its length.

11. A panel, adapted to be inserted in a hollow steel propeller blade from its root end opening, comprising an elongated, wedge-shaped plate member and means forming a channel along the major portion of the periphery thereof, said plate member being rounded at one end and having flat surfaces disposed in a common plane, a central, longitudinally extending portion offset laterally from said plane, and a semi-circular flange at the other end normal to said plane, said offset portion tapering from the flanged end to a point adjacent the rounded end, whereby the panel is adapted to be flexed throughout the greater portion of its length, said flanged end having slots formed therein whereby the radius of said end is decreased in response to an abnormal flexing of said panel whereby said end may be passed through said root end opening.

EVERETT P. PALMATIER.
WILLIAM E. BATES.

REFERENCES CITED

The following references are of record in the file of this patent:

UNITED STATES PATENTS

| Number | Name | Date |
|---|---|---|
| 1,862,328 | Caldwell | June 7, 1932 |
| 1,942,674 | Whitsett | Jan. 9, 1934 |
| 2,371,687 | Gerhardt | Mar. 20, 1945 |